(12) United States Patent
Koga et al.

(10) Patent No.: US 7,658,429 B2
(45) Date of Patent: Feb. 9, 2010

(54) VEHICLE SEAT SLIDE DEVICE

(75) Inventors: Yoshitaka Koga, Chiryu (JP); Hirokazu Suzumura, Aichi-ken (JP); Jueru Shimizu, Handa (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 21 days.

(21) Appl. No.: 12/052,179

(22) Filed: Mar. 20, 2008

(65) Prior Publication Data

US 2008/0238126 A1    Oct. 2, 2008

(30) Foreign Application Priority Data

Mar. 23, 2007 (JP) ............................. 2007-075998
Mar. 17, 2008 (JP) ............................. 2008-067616

(51) Int. Cl.
*B60N 2/02* (2006.01)
(52) U.S. Cl. .................................. 296/65.15; 248/429
(58) Field of Classification Search .............. 296/65.14, 296/65.15, 65.13; 248/429, 430
See application file for complete search history.

(56) References Cited

U.S. PATENT DOCUMENTS

| 5,207,473 | A  | * | 5/1993  | Nawa et al. ............... 296/65.15 |
| 5,823,499 | A  | * | 10/1998 | Ito et al. .................... 248/429 |
| 5,829,727 | A  | * | 11/1998 | Chinomi et al. ............ 248/429 |
| 6,220,642 | B1 | * | 4/2001  | Ito et al. .................... 296/65.14 |
| 6,260,922 | B1 | * | 7/2001  | Frohnhaus et al. ......... 297/330 |
| 6,959,900 | B2 | * | 11/2005 | Hoshihara et al. .......... 248/429 |
| 7,325,851 | B2 | * | 2/2008  | Ito et al. .................... 296/65.13 |
| 7,503,537 | B2 | * | 3/2009  | Koga ......................... 248/429 |
| 2006/0226674 | A1 | | 10/2006 | Ito et al. |
| 2007/0108360 | A1 | | 5/2007  | Ito et al. |

FOREIGN PATENT DOCUMENTS

| DE | 102 38 750 A1 | 3/2003 |
| JP | 9-142181      | 6/1997 |
| JP | 9-207632      | 8/1997 |
| JP | 11-208322     | 8/1999 |
| JP | 2000-85419    | 3/2000 |
| JP | 2006-290131   | 10/2006 |

OTHER PUBLICATIONS

U.S. Appl. No. 12/057,454, filed Mar. 28, 2008, Koga, et al.
U.S. App. No. 12/400,286, filed Mar. 9, 2009, Koga, et al.

* cited by examiner

*Primary Examiner*—Dennis H Pedder
*Assistant Examiner*—Pinel E Romain
(74) *Attorney, Agent, or Firm*—Oblon, Spivak, McClelland, Maier & Neustadt, L.L.P.

(57) ABSTRACT

A vehicle seat slide device includes lower rails, upper rails, screw shafts, nut members, an electric motor and a transmission mechanism. The transmission mechanism is composed of a drive reduction gear mechanism coupled directly to an output shaft of the electric motor, a pair of left and right direction conversion gear mechanisms coupled directly to the screw shafts, and a transmission shaft arranged to pass through an output gear of the drive reduction gear mechanism to be rotatably bodily with the output gear and coupled at opposite ends thereof to respective input gears of the direction conversion gear mechanisms. A lean force bracket is further provided to be secured at opposite ends thereof to the upper rails and supports the drive reduction gear mechanism and both of the direction conversion gear mechanisms.

16 Claims, 10 Drawing Sheets

VEHICLE SEAT SLIDE DEVICE

CROSS REFERENCE TO RELATED APPLICATION

This application is based on and claims priority under 35 U.S.C. 119 with respect to Japanese patent applications No. 2007-075998 filed on Mar. 23, 2007 and No. 2008-067616 filed on Mar. 17, 2008, the entire contents of which are incorporated herein by reference.

BACKGROUND OF THE INVENTION

1. Field of the Invention

This invention generally relates to a seat slide device, and more particularly, to a vehicle seat slide device for sliding a vehicle seat relative to a vehicle floor by driving a motor as a power source.

2. Discussion of the Related Art

Heretofore, as seat slide devices for vehicles, there have been known those of the constructions described in Japanese unexamined, published patent applications No. 9-142181 and No. 11-208322 and United States patent application publication No. US2006/0226674 A1 (equivalent of Japanese unexamined, published patent application No. 2006-290131) hereafter referred to respectively as "first to third patent documents". Each of these devices is provided with a pair of left and right lower rails secured to a vehicle floor and a pair of left and right upper rails slidably supported along the lower rails and supporting a vehicle seat.

Each lower rail has a nut member fixedly held therein, while each upper rail has a screw shaft rotatably held and extending in a forward-rearward direction and a drive mechanism for driving the screw shaft. The screw shaft is in screw-engagement with the nut member. By operating the drive mechanisms to rotate the screw shafts, the upper rails are slidden to move in the forward-rearward of the vehicle relative to the lower rails. With the slide movement, the position of the vehicle seat held on the upper rails is adjustable in the forward-rearward direction of the vehicle.

The drive mechanism described in each of the first and second patent documents is composed of an electric motor and two reduction sections each for reducing the rotational speed of the electric motor and for converting the direction in which the rotational power is transmitted, from one direction into another. The reduction sections are respectively attached to the left and right upper rails through respective brackets holding the reduction sections. The electric motor is held on one of the reduction sections with its rotational shaft extending in a width direction (i.e., transversely of the rails). The rotation of the electric motor is transmitted to the other reduction section not holding the electric motor, through a rod (transmission shaft). In the device described in the third patent document (i.e., the US publication), a drive reduction gear mechanism for reducing the rotational speed of an electric motor is united with the electric motor, and direction conversion gear mechanisms each for converting the transmission direction of rotational power are arranged on left and right sides one for each side. These direction conversion gear mechanisms are respectively attached to the left and right upper rails through respective brackets holding the reduction sections. The electric motor and the drive reduction gear mechanism are arranged on an mid portion of a transmission shaft which drivingly connects the left and right direction conversion gear mechanisms. The transmission shaft is coupled to an output gear of the drive reduction gear mechanism, so that the rotation from the electric motor is transmitted to the left and right direction conversion gear mechanisms at a reduced rotational speed.

Japanese unexamined, published patent applications No. 9-207632 (hereafter referred to as "fourth patent document") describes a seat slide device of the same construction as those described in the first and second patent documents. In the device, a flexible cable is used in place of the rod (transmission shaft) used in the first and second patent documents.

In the seat slide devices disclosed in the first to third patent documents, it may take place that the axes for the driving rotations which are inputted to the reduction sections or the direction conversion gear mechanisms attached to the left and right upper rails deviate from each other in the forward-rearward direction (occurrence of axis deviation). When the axis deviation occurs between the direction conversion gear mechanisms on the left and right upper rails, the upper rails cannot be slidden smooth or noises are generated with the rotational operation of the mechanisms. In the fourth patent document, the flexible cable is employed to serve as rotation transmission rod, so that the axis deviation is absorbed by the flexing of the cable to suppress the rotation-caused noises. However, the flexible cable capable of transmitting rotational power is expensive.

SUMMARY OF THE INVENTION

Accordingly, a need exists for seat slide apparatuses which are not susceptible to the drawbacks mentioned above.

According to the present invention, there is provided a vehicle seat slide device, which comprises a pair of left and right lower rails adapted to be mounted on a vehicle floor; a pair of left and right upper rails adapted to support a vehicle seat and slidably supported respectively on the lower rails; a left screw feed mechanism provided between the left lower rail and the left upper rail, the left screw feed mechanism including a screw shaft and a nut member screw-engaged with the screw shaft and relatively rotatable for moving the left upper rail along the left lower rail; a right screw feed mechanism provided between the right lower rail and the right upper rail, the right screw feed mechanism including a screw shaft and a nut member screw-engaged with the screw shaft and relatively rotatable for moving the right upper rail along the right lower rail; and an electric motor being in driving connection to the left and right screw feed mechanisms and constituting a driving source for effecting relative rotations between the screw shaft and the nut member of the left screw feed mechanism and between the screw shaft and the nut member of the right screw feed mechanism. A transmission mechanism is arranged between the electric motor and the left and right screw feed mechanisms. The transmission mechanism is composed of a housing which supports a drive reduction gear mechanism drivingly coupled to an output shaft of the electric motor, a pair of left and right casings which respectively support direction conversion gear mechanisms drivingly coupled to the left and right screw feed mechanisms, and a transmission shaft arranged to pass through an output gear of the drive reduction gear mechanism to be rotatable bodily with the output gear and drivingly coupled at opposite ends thereof to input gears of the direction conversion gear mechanisms. A lean force bracket is further provided to be secured to either one of the upper rails and the lower rails and supports the housing and the pair of left and right casings.

BRIEF DESCRIPTION OF THE DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

First Embodiment

Hereafter, with reference to FIGS. 1 to 5, a vehicle seat slide device in a first embodiment according to the present invention will be described in the form of a vehicle seat slide device mounted for a front seat of a vehicle. Terms "forward-rearward", "left-right (width)" and "upper-lower" directions as used throughout the specification are meant to indicate the same directions as used for vehicles.

Figure 1:
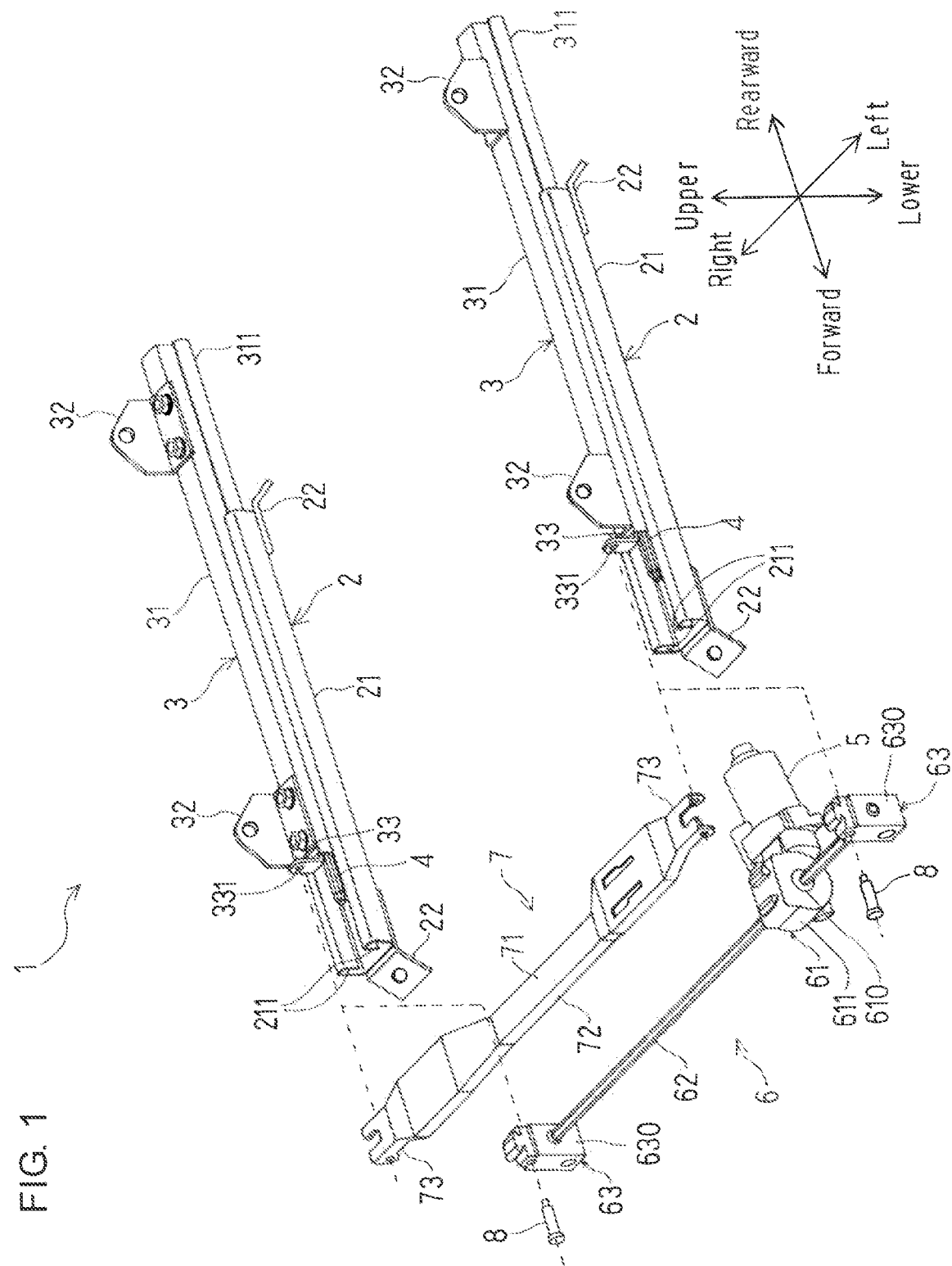
FIG. 1 is a perspective view showing components in a disassembled state of a vehicle seat slide device in a first embodiment according to the present invention.

Referring now to FIG. 1, the vehicle seat slide device generally indicated by reference numeral 1 is composed of lower rails 2, upper rails 3, screw shafts 4, nut members 9 (one only shown in FIG. 5), an electric motor 5, a transmission mechanism 6 and a lean force bracket 7.

The lower rails 2 are composed of a pair of left and right lower rails. Each lower rail 2 has a lower rail body section 21 and floor fixing sections 22. The lower rail body section 21 is constituted by an elongate member extending in a forward-rearward direction. The body section 21 takes the form of an approximately U-shape in cross-section and has flange portions 211 which are turned down inside from the upper edges of both side wall portions.

The floor fixing sections 22 are jointed with lower surfaces at both of the forward and rearward ends of each lower rail body section 21 by means of rivets (not shown), and each lower rail 2 is fixedly mounted on the vehicle floor (not shown) through the flower fixing sections 22.

The upper rails 3 are composed of a pair of left and right upper rails. Each upper rail 3 has an upper rail body section 31, a pair of seat fixing sections 32 and a bracket fixing section 33. The upper rail body section 31 is constituted by an elongate member extending in the forward-rearward direction. The body section 31 takes an approximately inverted U-shape in cross-section and has flange portions 311 which are formed by being turned up outside from the lower edges of both side wall portions. The section shape of each upper rail body section 31 in a direction perpendicular to the lengthwise direction is such that the flange portions 311 are respectively received within the spaces which each lower rail body section 21 associated therewith forms between the flange portions 211 and the side wall portions. The upper rail body section 31 and the lower rail body section 21 of each pair are engaged with each other through a plurality of balls (not shown) held therebetween, so that they are assembled to be relatively movable in the lengthwise direction. That is, since the flange portions 211 and 311 of the paired upper and lower rail body sections 21, 31 are engaged with each other through the balls to be prevented from moving relatively in the upper-lower direction, but to be relatively movable in the forward-rearward direction, each upper rail body section 31 is supported on each lower rail body section 21 paired therewith to be slidable in the forward-rearward direction.

The seat fixing sections 32 of the each upper rail 3 are screw-fixed on the upper surface at both of the forward and rearward ends of the upper rail body section 31, and a vehicle seat (not shown) is secured to the seat fixing sections 32 of the both upper rails 3.

The bracket fixing sections 33 are respectively screw-fixed to the forward end portions of the upper rail body sections 31 and respectively have through holes 331 for securing the lean force bracket 7.

The screw shafts 4 are respectively arranged inside the left and right upper rail body sections 31 one for each body section and are respectively provided with screw portions (not shown) within a predetermined area in the axial direction. Each screw shaft 4 extends in the forward-rearward direction and is arranged to protrude a part thereof from the forward end of the associated upper rail body section 31 and to leave the remaining part inside the associated upper rail body section 31. Each screw shaft 4 is supported inside the associated upper rail body section 31 to be axially immovable but to be rotatable relative to the associated upper rail body section 31. By arranging each screw shaft 4 inside the associated upper rail body section 31, each screw shaft 4 is housed in the rail assembly, so that the vehicle seat slide device 1 can be made to be compact in construction.

Figure 5:
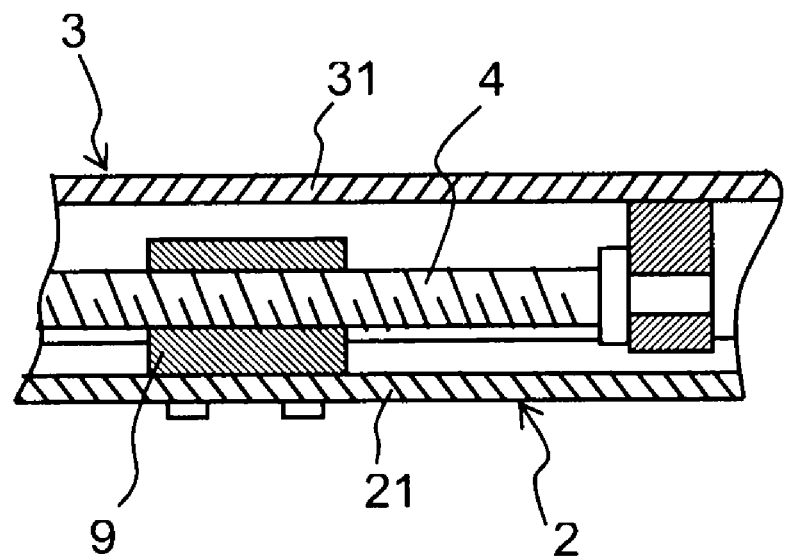
FIG. 5 is a fragmentary sectional view taken along the line V-V in FIG. 3.

As typically shown in FIG. 5, the nut members 9 are fixed inside the lower rail body sections 21 of the left and right lower rails 2 one for each body section and are screw-engaged with the screw portions of the screw shafts 4. Upon rotation, the screw shafts 4 change the positions thereof in the axial direction relative to the nut members 9 fixed to the lower rails 2 to be moved in the forward-rearward direction. As a consequence, the upper rail body sections 31 which rotatably support the screw shafts 4 are also moved in the forward-rearward direction. In the first embodiment, the screw shaft 4 and the nut member 9 arranged between the right lower rail 2 and the right upper rail 3 constitute a right screw feed mechanism for moving the right upper rail 3 along the right lower rail 2 upon rotation of the screw shaft 4. Likewise, the screw shaft 4 and the nut member (not shown) arranged between the left lower rail 2 and the left upper rail 3 constitute a left screw feed mechanism for moving the left upper rail 3 along the left lower rail 2 upon rotation of the screw shaft 4.

The electric motor 5 is drivingly coupled to the screw shafts 4 through a transmission mechanism 6 referred to later in detail and serves as a driving source for rotating the screw shafts 4. The transmission mechanism 6 is composed of a drive reduction gear mechanism 61, a transmission shaft 62 and direction conversion gear mechanisms 63.

The drive reduction gear mechanism 61 is a mechanism for reducing the rotational speed of the power inputted from the electric motor 5 to an input gear (not shown) thereof to transmit the power reduced in rotational speed from an output gear (not shown) thereof to the transmission shaft 62. More specifically, a worm (input gear) driven by the motor 5 and a worm wheel (output gear) meshing with the worm are housed and are rotatably carried in the housing 611 to which the motor 5 is fixed.

The drive reduction gear mechanism 61 is positioned close to one end side of the transmission shaft 62 in the width direction (i.e., in the axial direction thereof). The transmission shaft 62 passes through the output gear to be rotatable bodily therewith. The housing 611 has formed on the top thereof fastening portions 612 for securing the lean force bracket 7 thereto as described later in detail. The fastening portions 612 are a pair of protrusion members which are formed in parallel relation with a space therebetween in the forward-rearward direction. The protrusion members 612 are formed at the outsides of their root portions with narrow or neck portions 612a extending in the left-right direction (i.e., width direction). The housing 611 is brought into abutting contact with the lean force bracket 7 to position the drive reduction gear mechanism 61 against rotation.

The transmission shaft 62 is a shaft having the length which is sufficient to bridge between the direction conversion gear mechanisms 63 secured to the two left and right upper rail body sections 31, and being approximately hexagonal in cross-section. The transmission shaft 62 is rotatable bodily with the output gear (not shown) of the drive reduction gear mechanism 61 and transmits at its opposite ends the rotational power to the direction conversion gear mechanisms 63 described hereafter in detail.

The direction conversion gear mechanisms 63 are respectively secured to the left and right upper rails 3 and transmit to the screw shafts 4 the rotational power inputted to their input gears (not shown) from the transmission shaft 62. Each mechanism 63 functions as a device for converting the rotation of the transmission shaft 62 about the axis extending in the left-right direction into the rotation of the associated screw shaft 4 about the axis extending in the forward-rearward direction. Each mechanism 63 employs screw gears or crossed helical gears as the input and output gears (both not shown). The input and output gears are housed in a casing 630 with their rotational axes extending perpendicular and are rotatably carried in meshing engagement with each other. A bottomed hole being hexagonal in cross-section which allows the transmission shaft 62 to fit is formed at the rotational center of the input gear. The left and right input gears are fitted at the bottomed holes on the opposite ends of the transmission shaft 62 to rotate together and to hold the transmission shaft 61 in position in the width direction (i.e., left-right direction).

The output gears are in spline engagements with the forward ends of the screw shafts 4, respectively.

Figure 2:
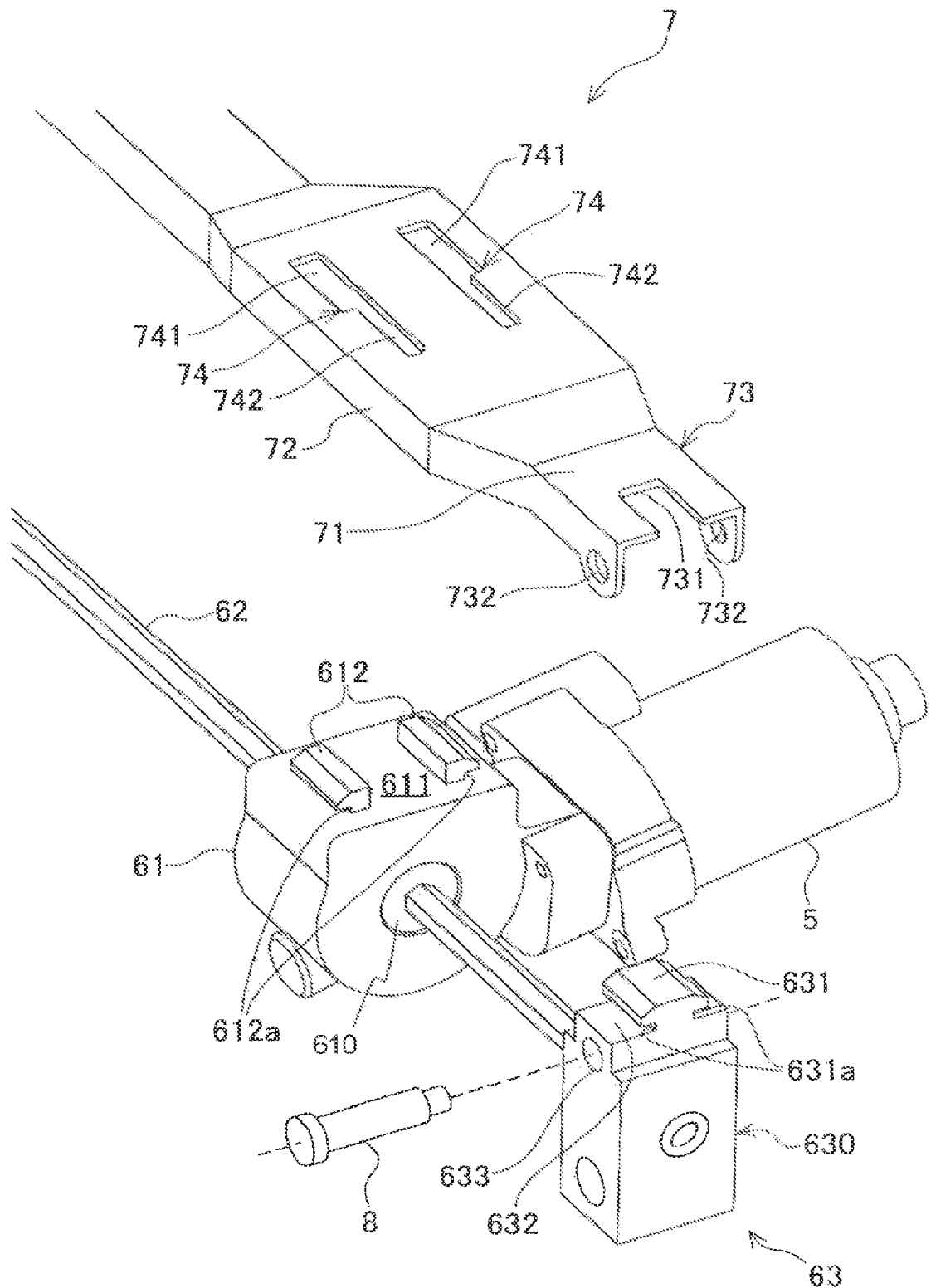
FIG. 2 is an enlarged perspective view showing primary components partly in a disassembled state of the vehicle seat slide device in the first embodiment.

As shown in FIG. 2, each casing 630 has at its top surface a contact surface 632, from which a hook portion 631 having at its root portion with a narrow or neck portion 631a extending in the left-right direction (i.e., width direction) is protruded for connection with the lean force bracket 7. Further, each casing 630 is provided therein with a through hole 633 which passes therethrough in the forward-rearward direction under the hook portion 631.

Figure 4:
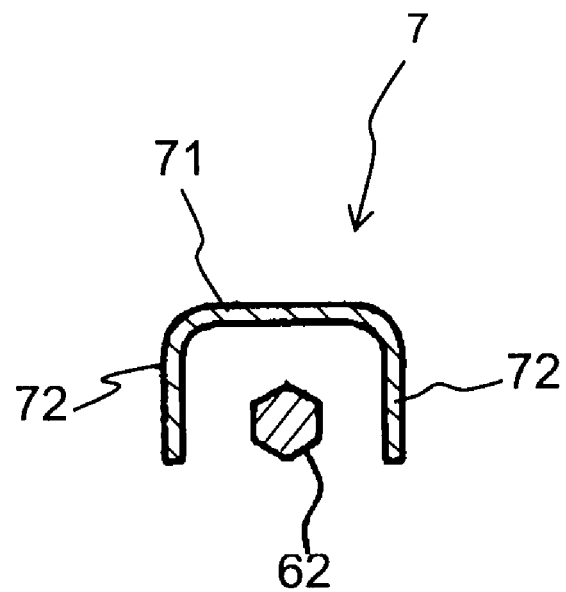
FIG. 4 is a sectional view taken along the line IV-IV in FIG. 3.

The lean force bracket 7 is located over the drive reduction gear mechanism 61 and the left and right direction conversion gear mechanisms 63 and fixedly supports these mechanisms 61, 63 thereto. The lean force bracket 7 is arranged to extend between the two direction conversion gear mechanisms 63 in the left-right direction. The bracket 7 has a bracket body section 71 including forward and rearward side flanges 72 and takes an approximately inverted U-shape in cross-section which is wide in the forward-rearward direction. The bracket 7 is positioned over the drive reduction gear mechanism 61 and the left and right direction conversion gear mechanisms 63 and thus, covers the transmission shaft 62 to receive the same in the space defined inside the bracket body section 71, as shown in FIG. 4. Further, the bracket 7 is provided at opposite end portions in the left-right direction with fixing portions 73 for fixing the direction conversion gear mechanisms 63 and is also provided with cutout portions 74 at its mid position in the left-right direction over the drive reduction gear mechanism 61. The lean force bracket 7 may be made of a resin, a metal or the like.

As typically shown in an enlarged scale in FIG. 2, the fixing portions 73 have slit portions 731 (one slit portion only shown in FIG. 2) which are cut out to open toward the opposite ends of the bracket body section 71 or which are cut out from the outer sides in the width direction of the bracket 7. Through holes 732 in alignment are formed at the side flanges 72 under each of the slit portions 731. The hook portions 631 formed on the casings 630 of the direction conversion gear mechanisms 63 are fitted in the slit portions 731, respectively. The through holes 732 under each slit portion 731 are brought into alignment with the through hole 633 of the associated direction conversion gear mechanism 63 and cooperate with the through hole 633 to compete a fixing through hole.

The cutout portions 74 are two aperture or opening portions formed with a space in the forward-rearward direction to elongate in the width direction and are composed of narrow opening portions 742 located on the left-half side in the left-right direction and the wide opening portions 741 located on the right-half side in the left-right direction continuously to the narrow opening portions 742, respectively. The narrow opening portions 742 open to be snugly engageable with the neck portions 612a of the fastening portions 612 of the drive reduction gear mechanism 61, while the wide opening portions 741 open to be the size that is wider than the narrow opening portions 742 in the forward-rearward direction and that enables the fastening portions 61 to be inserted thereinto. The fastening portions 612 of the drive reduction gear mechanism 61 are inserted into the cutout portions 74 at the wide opening portions 741 and are slidden toward the narrow opening portions 742 side, whereby the drive reduction gear mechanism 61 can be fixed in position. The length in the width direction of the wide opening portions 741 is the length that allows the fastening portions 612 to pass therethrough, while the length in the width direction of the narrow opening portions 742 is as long as that of the fastening portions 612.

Next, description will be made regarding the way of assembling the various components of the vehicle seat slide device 1 described above. First of all, the transmission shaft 62 is assembled to be held by the drive reduction gear mechanism 61. Then, the fastening portions 612 of the drive reduction gear mechanism 61 are inserted into the wide opening portions 741 of the cutout portions 74 of the lean force bracket 7. Then, the lean force bracket 7 is shifted toward the right to bring the fastening portions 612 into engagements with the narrow opening portions 742. Since the drive reduction gear mechanism 61 is provided with the fastening portions 612 and the lean force bracket 7 is provided with the cutout portions 74 into which the fastening portions 612 are to be inserted, it becomes possible to fix the lean force bracket 7 and the drive reduction gear mechanism 61 together only by inserting and engaging the fastening portions 612 into and with the cutout portions 74 in this manner. Therefore, it can be done easily to support and fix the lean force bracket 7 on the drive reduction gear mechanism 61. In particular, in the case of taking the configuration that the direction conversion gear mechanisms 63 hold the opposite end portions of the transmission shaft 62 to restrict the axial movement of the same, the relative movement between the fastening portions 612 and the cutout portions 74 in the direction for engaging movement is also restricted, so that the fixing therebetween can be reliably achieved without taking any other fixing measures than the engagements between the fastening portions 612 and the cutout portions 74. The fixing of the electric motor 5 and the drive reduction gear mechanism 61 to the lean force bracket 7 can be done easily.

After the assembling of the drive reduction gear mechanism 61 and the lean force bracket 7, the opposite ends of the transmission shaft 6 are respectively inserted into the input gears of the direction conversion gear mechanisms 63. At the same time, the hook portions 631 of the direction conversion gear mechanisms 63 are inserted through sliding motions into the slit portions 731 of the fixing portions 73 of the lean force bracket 7. Since the fixing portions 73 are provided with the slit portions 731 and the direction conversion gear mechanisms 63 are provided with the hook portions 631, it becomes possible easily to support and fix the lean force bracket 7 to the direction conversion gear mechanisms 63 only by inserting and engaging the hook portions 631 into and with the slit portions 731.

Figure 3:
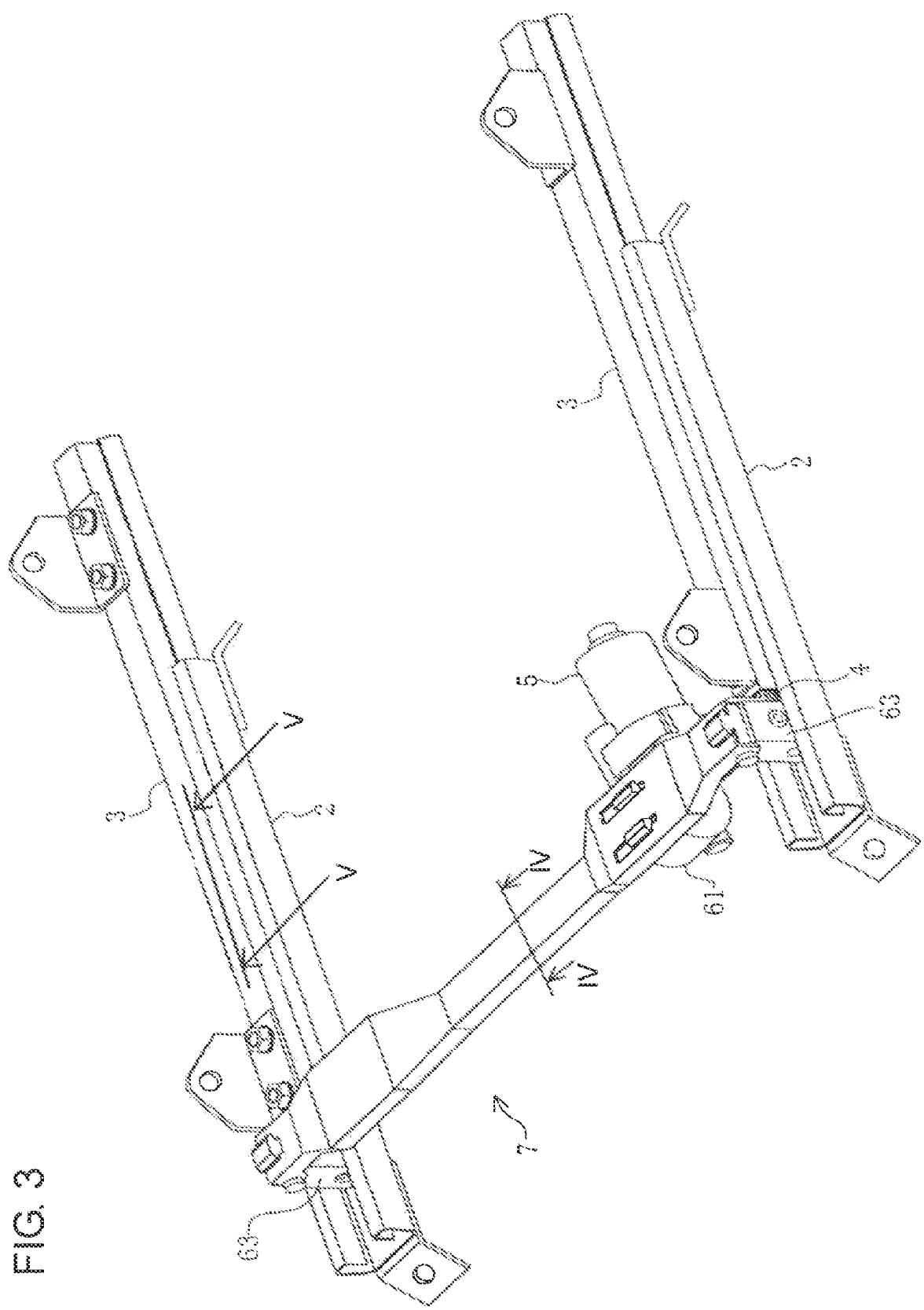
FIG. 3 is a perspective view showing the vehicle seat slide device in an assembled state.

In this state, the direction conversion gear mechanisms 63 are assembled with the upper rails 3. At this time, the fixing through holes are completed by bringing into alignment the through holes 732 of the fixing portions 73 of the lean force bracket 7, the through holes 633 of the direction conversion gear mechanisms 63 on the opposite sides and the through holes 331 of the bracket fixing portions 33 of the upper rail body sections 31. Then, the lean force bracket 7, the direction conversion gear mechanisms 63 and the upper rails 3 are fixed together by inserting screw bolts 8 as fixing members respectively into the fixing through holes now completed and by tightly engaging nuts (not shown) with screws formed on the tail ends of the screw bolts 8. The fixing operations are done with the forward ends of the screw shafts 4 being fitted at their splines in the output gears (not shown) of the direction conversion gear mechanisms 63, respectively. Thus, the vehicle seat slide device 1 is assembled as shown in FIG. 3. By performing the fixings with the screw bolts 8 passing through the fixing through holes and the nuts screwed up on the screw bolts 8, the support by the lean force bracket 7 can be attained more reliably. Particularly, the fixing through holes are provided to extend in a direction which intersects (preferably, intersects perpendicularly) with the direction in which the slit portion 731 are cut out, and the fixings are made by inserting the fixing members into the fixing through holes. This, in cooperation with the fixings by engagements between the slit portions 731 and the hook portions 631, makes it possible to reliably prevent any component from being disengaged from the assembly. This is because the engagements are made in the directions in which the assembled components intersect with one another, and serve to restrict the assembled components from moving to be disengaged from one another.

In the vehicle seat slide device 1 of the construction mentioned above, the sliding of the vehicle seat (not shown) in the forward-rearward direction is performed in the manner as described hereinafter. First of all, the electric motor 5 is driven, and the drive reduction gear mechanism 61 transmits the rotational power of the electric motor 5 at a reduced speed. The rotation is transmitted to the transmission shaft 62 passing through the output gear of the drive reduction gear mechanism 61. The input gears of the left and right direction conversion gear mechanisms 63 coupled to the transmission shaft 62 are rotated with the rotation of the transmission shaft 62. The rotation of the axis extending in the left-right direction is converted by the direction conversion gear mechanisms 63 into rotations of the axes extending in the forward-rearward direction, and the converted rotations are outputted to the output gears of the direction conversion gear mechanisms 63.

It is noted herein that because the drive reduction gear mechanism 61, the left and right direction conversion gear mechanisms 63 and the upper rail body sections 31 are united by the lean force bracket 7 being strong in rigidity, the left and right direction conversion gear mechanisms 63 can be restrained from deviating from the alignment therebetween.

Then, when the rotations are given to the screw shafts 4 coupled to the output gears of the direction conversion gear mechanisms 63, the relative rotations between the screw shafts 4 and the nut members 9 are converted into the change in the relative positions therebetween in the axial direction.

Since the nut members 9 are secured to the lower rails 2, the screw shafts 4 are moved relative to the nut members 9 in the forward-rearward directions. As a consequence, the upper rails 3 are sudden relative to the lower rails 2. This results in adjusting the position of the vehicle seat relative to the vehicle floor in the forward-rearward direction. The screw engagements of the screw portions of the screw shafts 4 with the nut members 9 restrict the sliding movements of the upper rails 3 relative to the lower rails 2 against the forward-rearward directed load which the vehicle seat imposes on the upper rails 3, so that the vehicle seat can be held at an adjusted position.

According to the vehicle seat slide device 1 in the first embodiment, the screw shafts 4 are respectively rotatably supported on the pair of left and right upper rails 3, while the nut members 9 screw-engaged with the screw shafts 4 are respectively secured to the lower rails 2. Then, the transmission mechanism 6 for transmitting the rotation of the electric motor 5 to the screw shafts 4 is composed of the drive reduction gear mechanism 61 drivingly coupled to the output shaft of the electric motor 5, the pair of left and right direction conversion gear mechanisms 63 drivingly coupled to the screw shafts 4, and the transmission shaft 62 arranged to pass through the output gear 610 of the drive reduction gear mechanism 61 to be rotatable bodily with the output gear 610 and drivingly coupled at opposite ends thereof to input gears of the direction conversion gear mechanisms 63. Further, the lean force bracket 7 is secured at opposite ends thereof to the pair of left and right casings 630 which respectively support the direction conversion gear mechanisms 63, and also to the upper rails 3. The housing 611 supporting the drive reduction gear mechanism 61 is secured to the mid portion of the lean force bracket 7.

With this construction, since the rotational speed of the electric motor 5 can be sufficiently reduced by the drive reduction gear mechanism 61 and since the direction conversion gear mechanisms 63 can take a simple construction that only converts the direction for rotational transmission from one direction to another while transmitting the rotation at the same speed or at a slightly reduced speed, the vehicle seat slide device 1 can be reduced in meshing vibration and can be downsized. Therefore, it becomes possible to downsize the casings 630 supporting the direction conversion gear mechanisms 63 therein and hence, to make small the cross-section of the upper rails 3 to which the casings 630 are secured. Further, since the direction conversion gear mechanisms 63 are to transmit rotations at the same speed or at a slightly reduced speed, they can be made of a synthetic resin as a whole if need be. In addition, since the axis of the output shaft of the electric motor 5 is vertically offset from the axis of the transmission shaft 62 which transmits the rotation from the electric motor 5 to the screw shafts 4, the subassembly of the electric motor 5 and the drive reduction gear mechanism 61 can be arranged alongside, for example, either one of the upper rails 3, so that a space can be secured between the subassembly and the vehicle seat.

Further, since the drive reduction gear mechanism 61 and the left and right direction conversion gear mechanisms 63 are united by being supported by the lean force bracket 7, there can be attained an advantage that the occurrence of the deviation from the alignment between the left and right direction conversion gear mechanisms 63 is not theoretically needed to be taken into consideration. In particular, the lean force bracket 7 so united is further enhanced in rigidity as a whole as being secured also to the upper rails 3. This ensures that the drive reduction gear mechanism 61, the left and right direction conversion gear mechanisms 63 and the upper rails 3 move as one unit in the forward-rearward direction of the vehicle during the operation of the electric motor 5. That is, there hardly occurs any misalignment between the left and right subassemblies of the upper rails 3 and the direction conversion gear mechanisms 63. Accordingly, since the misalignment hardly occurs, it can be realized to suppress the generation of noises.

Further, since the transmission mechanism 6 is secured by a single rigid member constituted by the lean force bracket 7, the direction conversion gear mechanisms 63 can easily be positioned in the forward-rearward direction. Further, since the lean force bracket 7 is fixed to the upper rails 3, the same can easily be positioned in the forward-rearward direction.

In addition, the provision of the fixing portions 73 on the lean force bracket 7 enables the direction conversion gear mechanisms 63 to be fixed to the fixing portions 73, so that further enhancement in rigidity can be realized as a whole.

Moreover, while the aforementioned prior art devices employ left and right brackets which are independently arranged to secure a reduction section or direction conversion gear mechanisms, the vehicle seat slide device 1 in the present embodiment uses the single lean force bracket 7, and this advantageously results in a decrease in the number of components.

Further, since the lean force bracket 7 covers the transmission shaft 62 inside thereof as shown in FIG. 4, possible causes to obstruct the rotation of the transmission shaft 62 can be lessened. The transmission shaft 62 is a primary component or member which is coupled to both of the output gear of the drive reduction gear mechanism 61 and the input gears of the direction conversion gear mechanisms 63 to transmit rotation therebetween. In particular, the transmission shaft 62 is a member which is not only arranged under the vehicle seat and very close to the passenger at the vehicle seat but is also rotated. Therefore, by obviating any interference from outside to the rotation, it becomes possible to enhance safeness and to ensure the operation in the transmission function. Accordingly, the shape of the lean force bracket 7 is desired to take the shape that covers at least one side in the forward-rearward direction of the vehicle seat which one side is accessed by the passenger at the vehicle seat. In addition, by forming the lean force bracket 7 to the cross-section capable of covering the transmission shaft 62, the lean force bracket 7 is further increased in the rigidity against bending moment, and this advantageously results in further effectively preventing the misalignment between the left and right upper rails 3.

Second Embodiment

Next, with reference to FIGS. 6 to 10, description will be made regarding a vehicle seat slide device 12 in a second embodiment according to the present invention, wherein the housing 615 which supports the drive reduction gear mechanism 61 securing the electric motor 5 thereto is fixed to the lean force bracket 7 through a damper 65 having an elastic area. The components in the second embodiment are the same as those in the first embodiment except components which secure the housing 615 and casings 635 to the leans force bracket 7. The same components are designated by the same reference numerals as used in the first embodiment and will be omitted from being described in detail. Therefore, the components which differ from those in the first embodiment will be described hereinafter.

Figure 6:
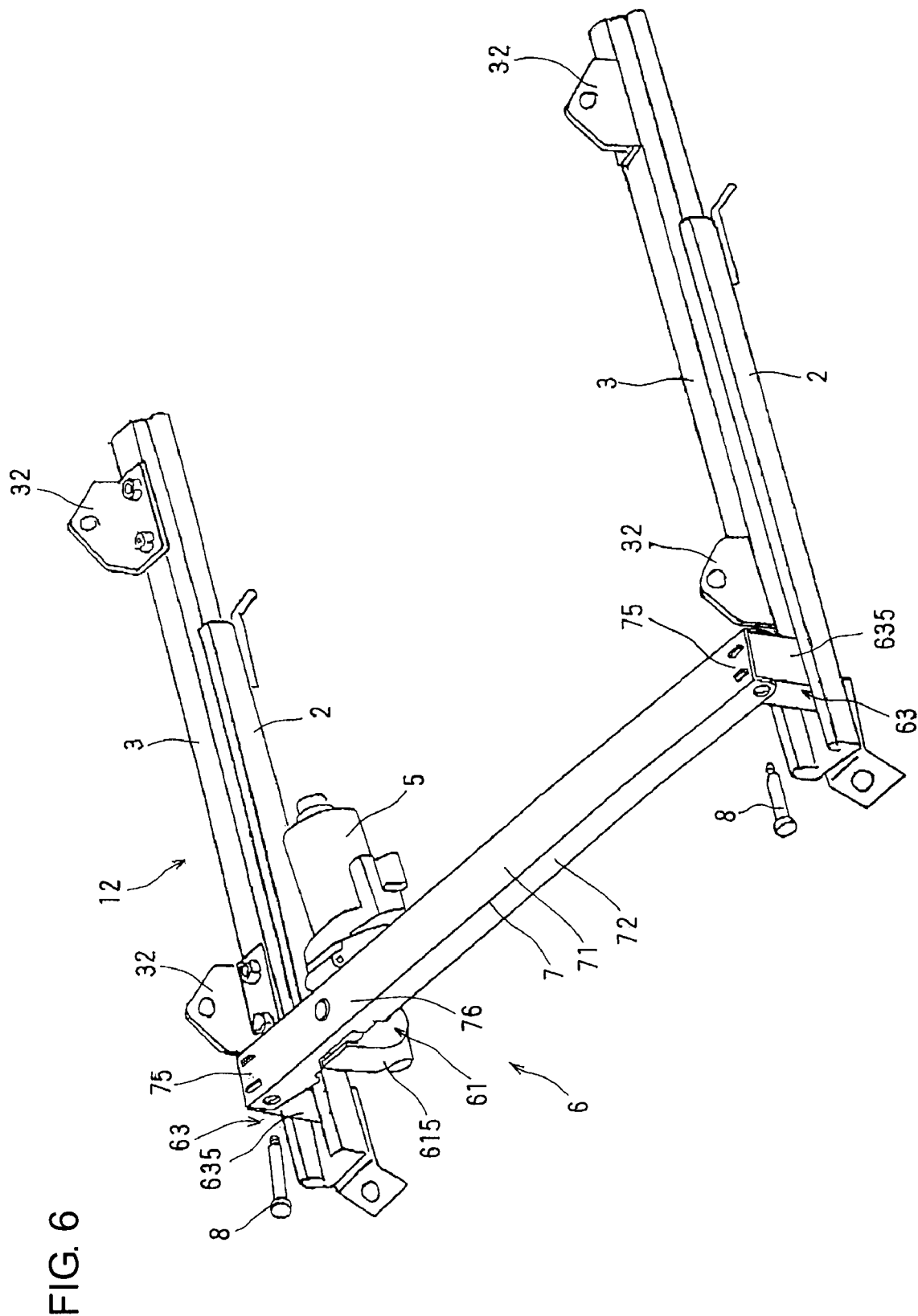
FIG. 6 is a perspective view of a vehicle seat slide device in a second embodiment according to the present invention.
Figure 7:
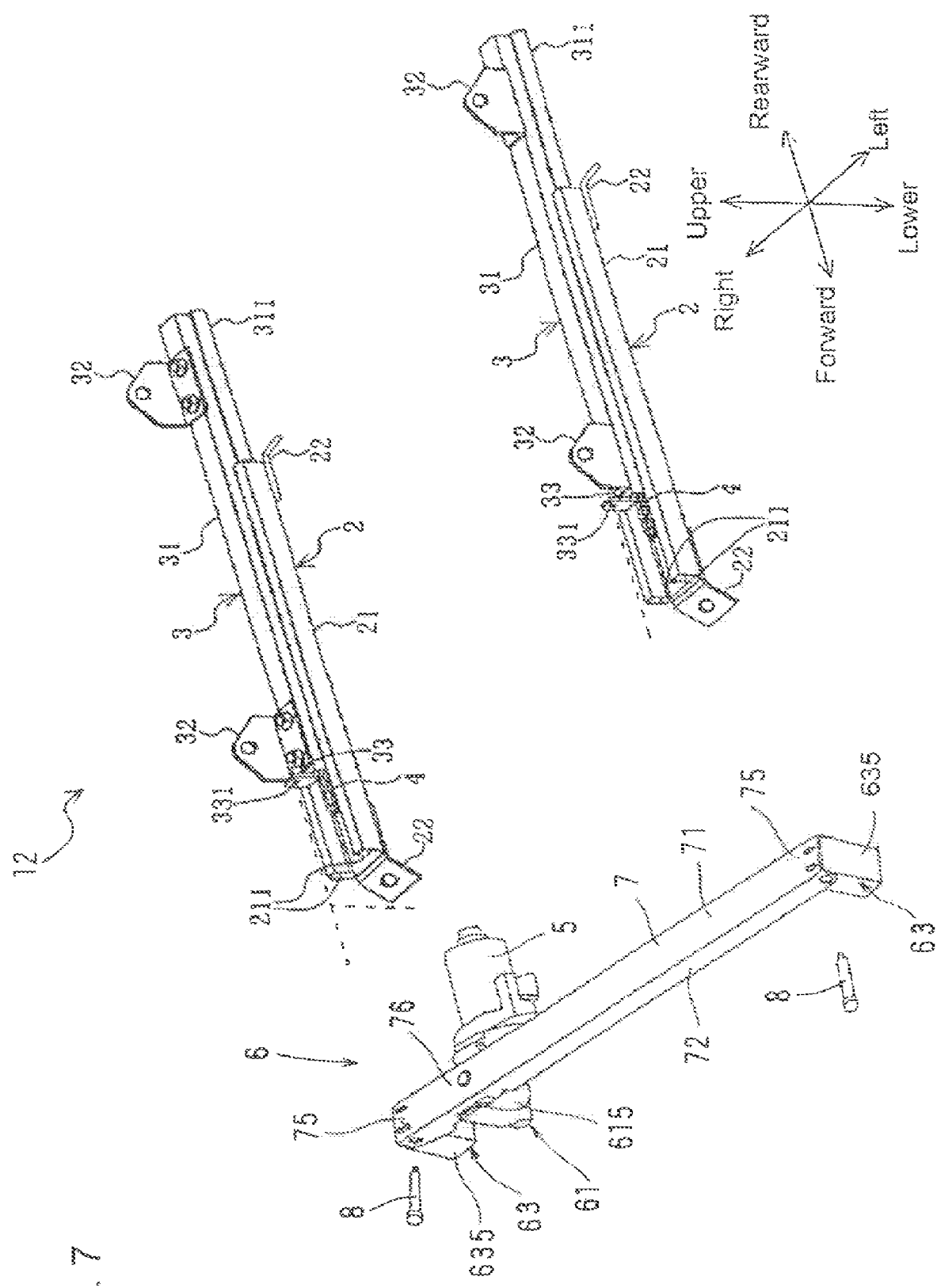
FIG. 7 is a perspective view showing components in a disassembled state of the vehicle seat slide device in the second embodiment.

As shown in FIGS. 6 and 7, the vehicle seat slide device 12 is composed of the lower rails 2, the upper rails 3, the screw shafts 4, the nut members (not shown), the electric motor 5, the transmission mechanism 6 and the lean force bracket 7. The lean force bracket 7 is provided with the bracket body section 71 including the forward and rearward side flanges 72, and takes the form of an approximately inversed U-shape in cross-section taken in the forward-rearward direction. The lean force bracket 7 is provided with fixing portions 75 at opposite ends in the left-right direction and an embracing portion 76 which is at its mid position in the left-right direction over the drive reduction gear mechanism 61. The fixing portions 75 have secured thereto the casings 635 which respectively support the direction conversion gear mechanisms 63, and are secured to the upper rails 3 on which the screw shafts 4 are supported, respectively.

Figure 8:
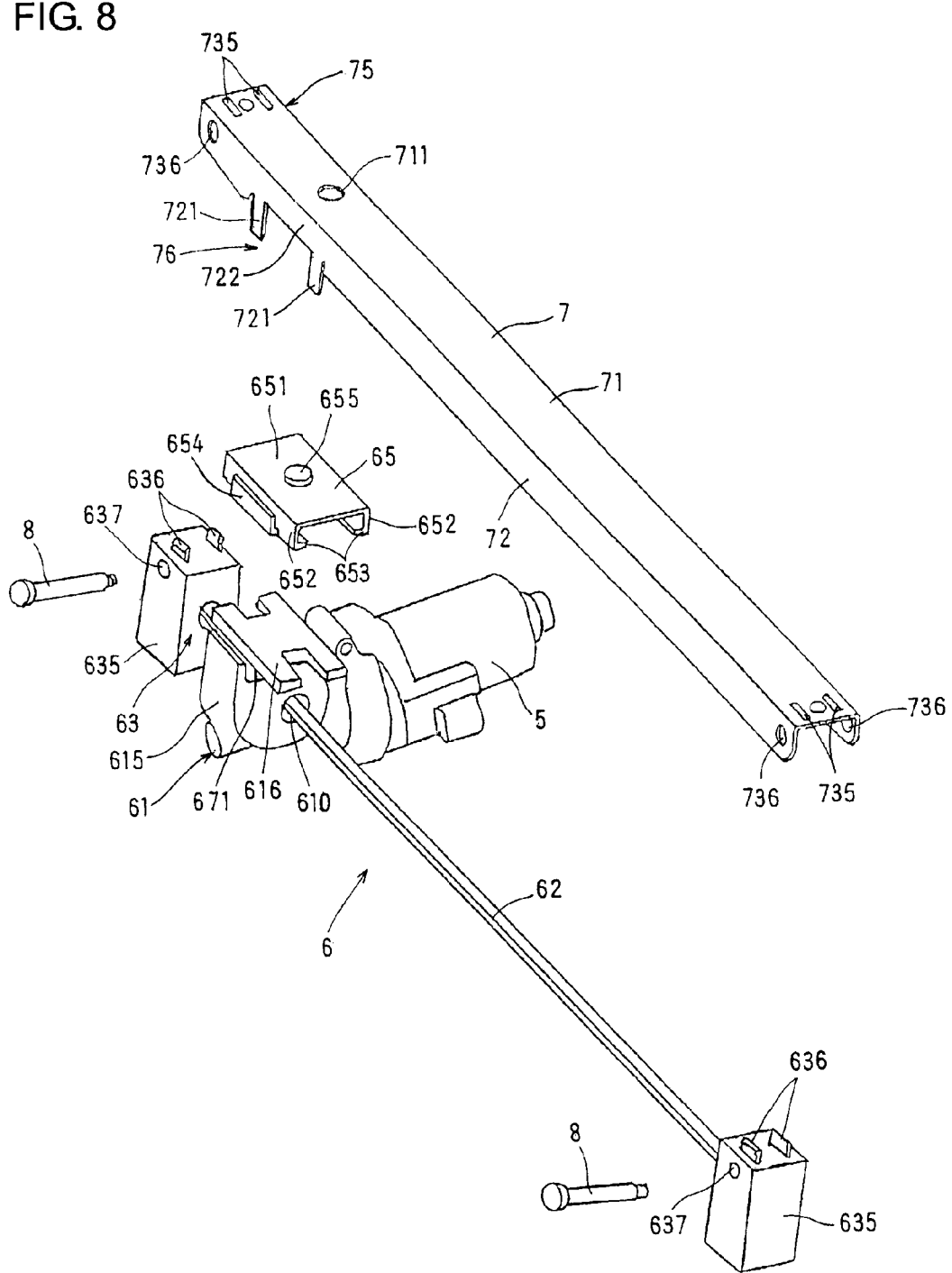
FIG. 8 is an enlarged perspective view showing primary components partly in a disassembled state of the vehicle seat slide device in the second embodiment.

As shown in FIG. 8, each of the fixing portions 75 has a slit portion 735 which includes two slits formed at each end of the bracket body section 71. Through holes 736 in alignment are formed at the side flanges 72 under each slit portion 735. Two hook portions 636 which are formed on the casings 635 respectively supporting the direction conversion gear mechanisms 63 are fitted in the slit portion 735. The through holes 736 under each slit portion 735 are fixing through holes and are brought into alignment with through hole 637 of the associated casing 635 when the hook portion 636 of the associated casing 635 is fitted in the slit portion 735 of the lean force bracket 7.

Figure 9:
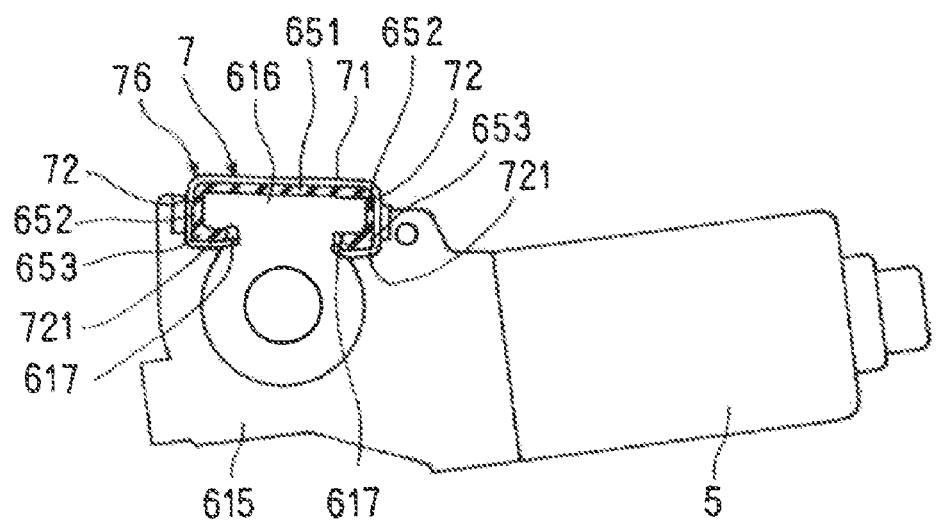
FIG. 9 is an enlarged cross-sectional view of a lean force bracket taken to across one of left and right embracing portions of the lean force bracket.

The embracing portion 76 is located in the vicinity of the right end of the lean force bracket 7 and fixes the housing 615 to the lean force bracket 7 by embracing together with the damper 65 a fastening portion 616 of a housing 615 which supports the drive reduction gear mechanism 61. Specifically, the side flanges 72 of the lean force bracket 7 protrude four embracing strips 721 from a portion to which the fastening portion 616 of the housing 615 is to be secured. The four embracing strips 721 are provided to face the forward and rearward surfaces on the left and right ends of the fastening portion 616. The housing 615 is secured to the lean force bracket 7 by bending the four embracing strips 721 to embrace the fastening portion 616 together with the damper 65, as shown in FIGS. 8 and 9. The height of the side flanges 722 at the embracing portion 76 is an approximately the same as the thickness of the fastening portion 616. The fastening portion 616 is a protrusion formed on the top of the housing 615 and forms a pair of narrow portions 617 extending in the left-right direction, on both sides of the root portion thereof.

Figure 10:
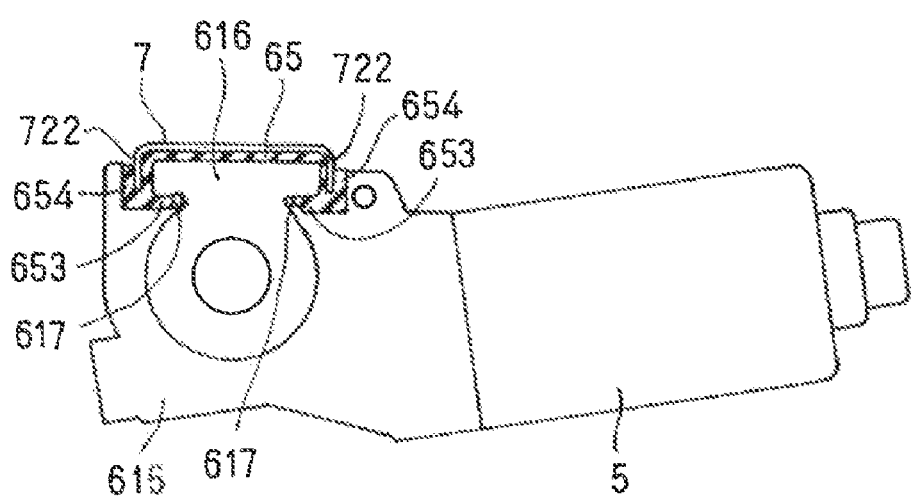
FIG. 10 is an enlarged cross-sectional view of the lean force bracket taken to across an intermediate position between the left and right embracing portions of the lean force bracket.

The damper 65 is made of a material having an elastic area such as rubber or the like. The damper 65 has formed thereon a ceiling wall portion 651, forward and rearward side wall portions 652 and forward and rearward bottom edge portions 653 which are compressively put between the fastening portion 616 and the lean force bracket 7. That is, the top surface and the forward and rearward side surfaces of the fastening portion 616 and the lower surfaces of the pair of narrow portions 617 cooperate with the bracket body section 71, the side flanges 72 and the embracing strips 721 of the lean force bracket 7 to sandwich therebetween the ceiling wall portion 651, the forward and rearward side wall portions 652 and the forward and rearward bottom edge portions 653 of the damper 65. On the forward and rearward side wall portions 652 of the damper 65, forward and rearward outer wall portions 654 are formed to extend from the bottom edge portions 653 side of the side wall portions 652 toward the ceiling wall portion 651 side. The forward and rearward outer wall portions 654 sandwich the side flanges 722 of the embracing portion 76 between themselves and the side wall portions 652 of the damper 65, as shown in FIGS. 8 and 10. A round protrusion 655 is protruded from the top surface of the ceiling wall portion 651 and is fitted in a positioning hole 711 formed on the bracket body section 71 of the lean force bracket 7.

As described hereinabove, since the housing 615 supporting the drive reduction gear mechanism 61 is secured to the lean force bracket 7 through the damper 65 having an elastic area, the vibration generated in the drive reduction gear mechanism 61 can be prevented from being transmitted to the lean force bracket 7 and then, in turn to the vehicle seat and the vehicle floor through the upper rails 3 and the lower rails 4. Further, since the embracing portion 76 provided on the lean force bracket 7 embraces the fastening portion 616 formed on the housing 615 together with the damper 65 to secure the housing 615 to the lean force bracket 7, it can be realized to reliably secure the housing 615 to the lean force bracket 7 through the damper 65 in a simplified construction.

Although the preferred embodiments according to the present invention have been descried hereinabove, the present invention is not limited to the foregoing embodiments. For example, although in the foregoing embodiments, the screw shafts and the nut members are attached respectively to the upper rails and the lower rails, the vehicle seat slide device may take the configuration that the arrangements of the screw shafts and the nut members are replaced to attach the screw shafts and the nut members respectively to the lower rails and the upper rails. Further, the electric motor and the drive reduction gear mechanism which are united into a single unit may be arranged at any position along the transmission shaft. Besides, the cross-section shape of the lean force bracket suffices to be of the shape that covers the forward and over sides of the transmission shaft. Where the transmission mechanism and the lean force bracket are arranged on the rearward end side of the rails, the cross-section shape of the lean force bracket may be modified to the shape that covers the rearward and over sides of the transmission shaft.

Third Embodiment

Next, with reference to FIGS. 11 and 12, description will be made regarding a vehicle seat slide device 13 in a third embodiment according to the present invention, wherein the nut members 9 are rotatably carried on either one of the lower rails 2 and the upper rails 3. The third embodiment is the same as the foregoing first embodiment except that the nut members 9 are rotatably supported on either one of the lower rails 2 and the upper rails 3 and that the screw shafts 41 are secured to the other of the lower rails 2 and the upper rails 3. Therefore, the same components are designated by the same reference numerals as used in the first embodiment and will be omitted from being described in detail. Therefore, components which differ from those in the first embodiment will be described hereinafter.

Figure 11:
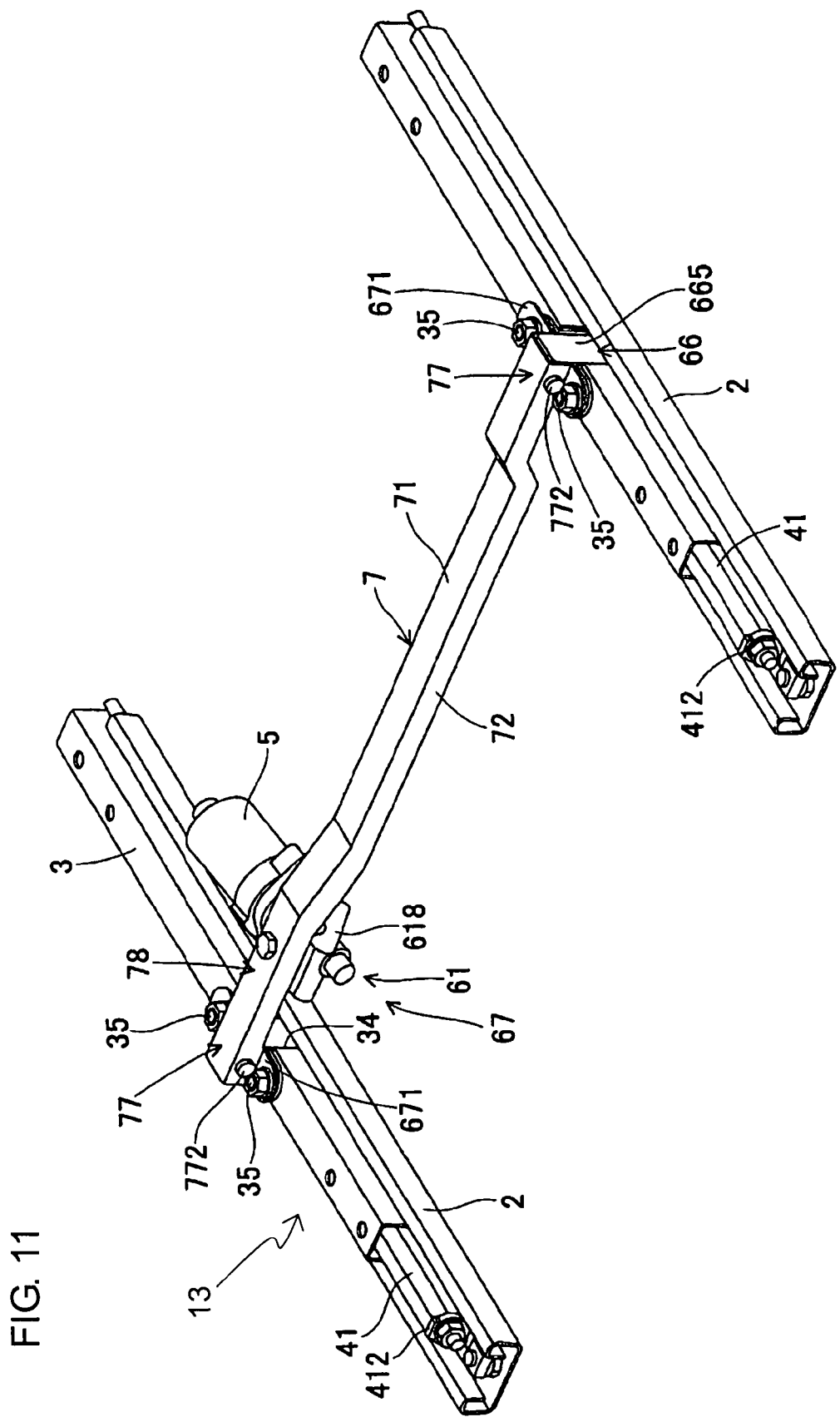
FIG. 11 is a perspective view of a vehicle seat slide device in a third embodiment according to the present invention.
Figure 12:
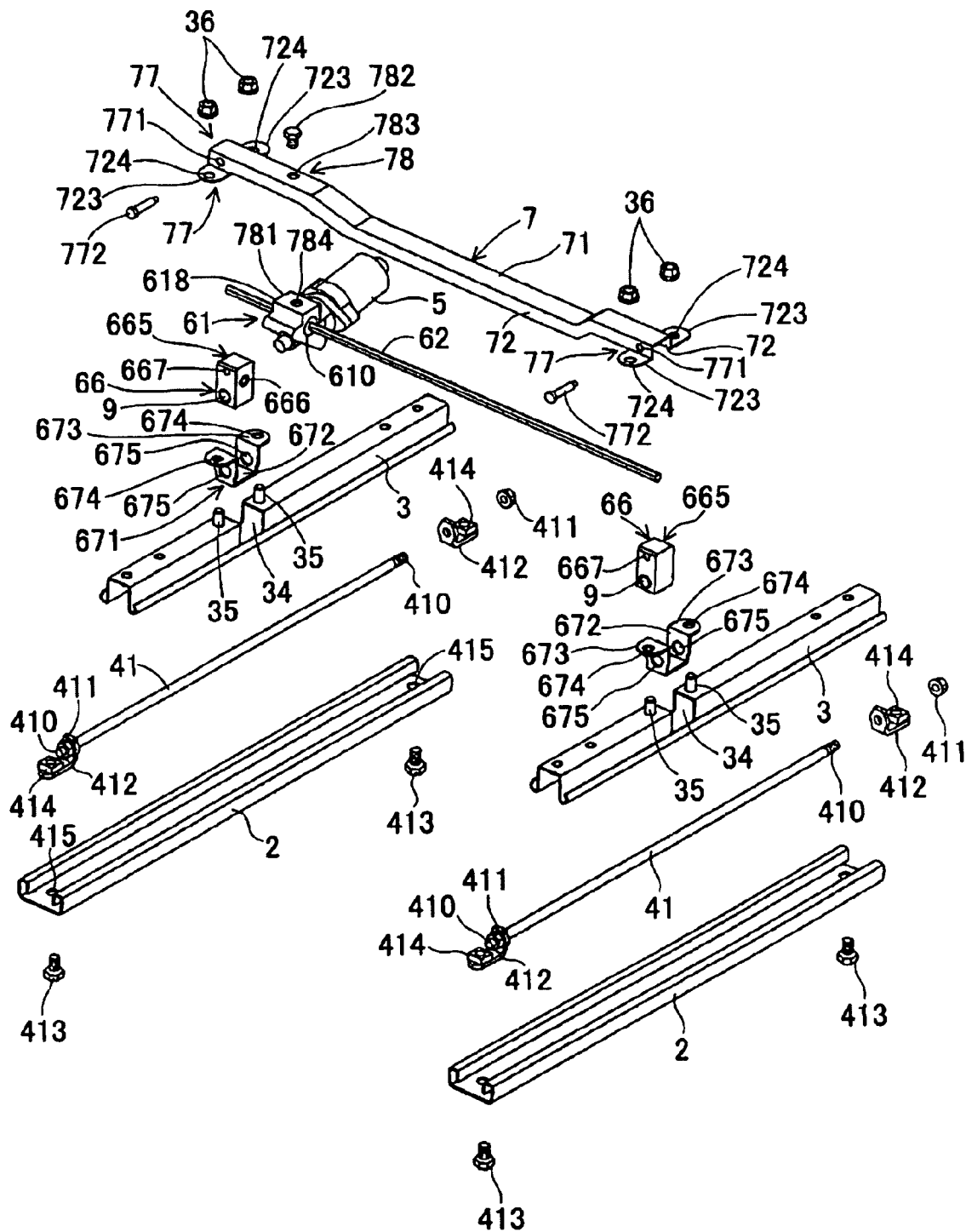
FIG. 12 is a perspective view showing components in a disassembled state of the vehicle seat slide device in the third embodiment.

As shown in FIGS. 11 and 12, the vehicle seat slide device 13 is composed of the lower rails 2, the upper rails 3, the screw shafts 41, the nut members 9, the electric motor 5, a transmission mechanism 67 and the lean force bracket 7. The lean force bracket 7 is provided with the bracket body section 71 including the forward and rearward side flanges 72, and takes an approximately inversed, wide U-shape in cross-section taken in the forward-rearward direction. The lean force bracket 7 is provided with the fixing portions 77 at opposite ends thereof in the left-right direction and is also provided with a mounting portion 78 at a mid position thereof in the left-right direction over the drive reduction gear mechanism 61. The casings 665 each supporting the nut member 9 and the direction conversion gear mechanism 66 are respectively secured to the fixing portions 77, and the lean force bracket 7 is secured to the upper rails 3 at the fixing portions 77. The housing 618 of the drive reduction gear mechanism 61 is mounted on the lean force bracket 7 at the mounting position 78. In the casings 665, the nut members 9 are carried to be rotatable about respective axes extending in the forward-rearward direction, and input gears 666 (one only shown in FIG. 12) are carried to be rotatable about an axis extending in the left-right direction. The nut members 9 have female screws therein and are screw-engaged with the screw shafts 41, respectively. The input gears 666 in the casings 665 are respectively fitted on opposite ends of the transmission shaft 62 of a hexagon in cross-section to be rotatable bodily therewith, and the transmission shaft 62 extends in the left-right direction. Mutually meshing crossed helical gears (not shown) are formed respectively on external surfaces of the nut member 9 and the input gear 666 carried in each of the casings 665.

Each casing 665 is secured to an associated one end of the lean force bracket 7 by means of a bolt 772 and a nut as fixing members. The bolt 772 is inserted into through holes 771, 667 which are formed to pierce the side flanges 72 of the fixing portion 77 and the casing 665 in the forward-rearward direction, and is engaged with the nut to secure the casing 665 to the associated one end of the lean force bracket 7. The two side flanges 72 of each fixing portion 77 are provided at the lower ends thereof with fixing tongue-like portions 723, which are bent outward in the forward-rearward direction, and fixing holes 724 are formed on the fixing tongue-like portions 723.

A cutout 34 is formed at a longitudinal mid position of each upper rail 3, and bolts 35 as fixing means are upright from each upper rail 3 at positions close to the longitudinal ends of the cutout 34. Reference numeral 671 denotes support brackets, which are provided with holder portions 672 taking a U-shape for holding the casings 665, respectively. Respective upper ends of each holder portion 672 serve as attaching portions 673 by being bent outward in the forward-rearward direction. Attaching holes 674 are formed on the attaching portions 673 of each support bracket 671. Through holes 675 are formed to pierce the holder portions 672 of the support brackets 671 in the forward-rearward direction, and the screw shafts 41 which are respectively secured to the lower rails 2 to be immovable relative thereto pass through the through holes 675. Each support bracket 671 is mounted on the associated upper rail 3, with the holder portion 672 received in the cutout 34 by fitting the attaching holes 674 on the bolts 35. Then, the lean force bracket 7 which already has the casings 665 fixed to the opposite ends thereof is fitted at the fixing holes 724 of the fixing tongue-like portions 723 on the bolts 35 through the attaching portions 673 of the support brackets 671. By screwing nuts 36 on the bolts 35, the attaching portions 673 of each support bracket 671 are sandwiched between the upper rail 3 and the fixing tongue-portions 723 at both longitudinal sides of each cutout 34, and the opposite ends of the lean force bracket 7 are secured to the upper rails 3, with the casings 665 received in the holder portions 672.

Each screw shaft 41 is provided with a feed screw portion substantially over the entire length thereof and is also provided with small-diameter fixing screw portions at opposite ends thereof. With the casings 665 received in the cutouts 34 together with the support brackets 671, each screw shaft 41 is inserted into the though holes 675 of the associated support bracket 671 and is brought into screw engagement with the associated nut member 9 rotatably carried in the casing 665. With each screw shaft 41 being in screw engagement with the nut member 9, a pair of fixing brackets 412 are fitted on the small-diameter fixing screw portions at the opposite ends of each screw shaft 41 and are secured bodily to the screw shaft 41 by means of nuts 411 which are then screwed respectively on the small-diameter fixing screw portions. Thereafter, the fixing brackets 412 on the opposite ends of each screw shaft 41 are secured to the associated lower rail 2 by means of bolts 413 which are screwed into nuts 414 secured to the fixing brackets 412 through fixing holes 415 formed on the bottom wall of the lower rails 2, whereby the screw shafts 41 are non-rotatably secured to the lower rails 2 to extend in the forward-rearward direction.

In the third embodiment, the screw shaft 41 and the nut member 9 arranged between the right lower rail 2 and the right upper rail 3 constitute a right screw feed mechanism for moving the right upper rail 3 along the right lower rail 2 upon rotation of the nut member 9. Likewise, the screw shaft 4 and the nut member 9 arranged between the left lower rail 2 and the left upper rail 3 constitute a left screw feed mechanism for moving the left upper rail 3 along the left lower rail 2 upon rotation of the nut member 9.

The mounting portion 78 is located in the vicinity of the right end of the lean force bracket 7. At the mounting portion 78, the housing 618 which supports the drive reduction gear mechanism 61 with the electric motor 5 secured thereto is provided at its upper end with a fitting portion 781 rectangular in the top contour. The housing 618 is secured to the lean force bracket 7 by means of a bolt 782, with the fitting portion 781 being in contact at its top surface with the bracket body section 71 and being fitted between the side flanges 72. At the mounting portion 78, a mounting hole 783 is formed on the bracket body section 71, and the bolt 782 is inserted to pass through the mounting hole 783 and is screwed into a female screw hole 784 opening on the top surface of the fitting portion 781, whereby the housing 618 is secured to the lean force bracket 7.

In the vehicle seat slide device 13 as constructed above, the rotation of the electric motor 5 is reduced by the drive reduction gear mechanism 61 and is transmitted through the transmission shaft 62 to the direction conversion gear mechanisms 66 to rotate the nut members 9. The relative rotations between the nut members 9 and the screw shafts 41 are converted into the changes in the relative axial positions therebetween. Since the screw shafts 41 are immovably secured to the lower rails 2, the nut members 9 are moved in the forward-rearward direction relative to the screw shafts 4. As a consequence, the upper rails 3 are moved to slide relative to the lower rails 2, respectively. Thus, the position of the vehicle seat is adjusted in the forward-rearward direction relative to the vehicle floor.

In the vehicle seat slide device 13 in the third embodiment, the nut members 9 are rotatably supported on the pair of left and right upper rails 3, while the screw shafts 41 in screw-engagements with the nut members 9 are secured to the lower rails 2, respectively. The transmission mechanism 67 for transmitting the rotation of the electric motor 5 to the nut members 9 is composed of the drive reduction gear mechanism 61 drivingly coupled to the output shaft of the electric motor 5, the pair of left and right direction conversion gear mechanisms 66 rotatably supporting the nut members 9 for transmitting the rotations of the input gears 666 to the nut members 9 while converting the rotations of the input gears 666 to be transmitted from one direction to another, and the transmission shaft 62 arranged passing through the output gear 610 of the drive reduction gear mechanism 61 to be rotated bodily with the output gear 610 and drivingly coupled at the opposite ends thereof to the input gears 666 of the direction conversion gear mechanisms 66. Further, the lean force bracket 7 is secured at the fixing portions 77 formed at the opposite ends thereof to the pair of left and right casings 665 which support the direction conversion gear mechanisms 66 therein, and also to the upper rails 3, respectively. The housing 618 supporting the drive reduction gear mechanism 61 therein is secured to the mid portion of the lean force bracket 7.

With the aforementioned construction, since the rotational speed of the electric motor 5 can be sufficiently reduced by the drive reduction gear mechanism 61 and since the direction conversion gear mechanisms 66 can take a simple construction that only converts the direction for rotational transmission from one direction to another while transmitting the rotation at the same speed or at a slightly reduced speed, the vehicle seat slide device 13 can be reduced in meshing vibration and can be downsized. Therefore, it becomes possible to downsize the casings 665 supporting the direction conversion gear mechanisms 66 therein and hence, to make small the cross-section of the upper rails 3 to which the casings 665 are secured. Further, since the direction conversion gear mechanisms 66 transmit rotation at the same speed or at the slightly reduced speed, they can be made of a synthetic resin as a whole if need be. In addition, since the axis of the output shaft of the electric motor 5 is vertically offset from the axis of the transmission shaft 62 which transmits the rotation from the electric motor 5 to the nut members 9, the subassembly of the electric motor 5 and the drive reduction gear mechanism 61 can be arranged alongside, for example, either one of the upper rails 3, so that a space can be secured between the subassembly and the vehicle seat.

Various features and many of the attendant advantages in the foregoing embodiments will be summarized as follows:

In the foregoing first to third embodiments, as typically shown in FIGS. 1, 7 and 12, the left and right screw feed mechanisms each including the screw shaft 4 (41) and the nut member 9 are provided between the lower rails 2 and the upper rails 3 for moving the upper rails 2 along the lower rails 3 through the relative rotations between the screw shafts 4 (41) and the nut members 9. The transmission mechanism 6 (67) for transmitting the rotation of the electric motor 5 to the left and right screw feed mechanisms is composed of the drive reduction gear mechanism 61 drivingly coupled to the output shaft of the electric motor 5, the pair of left and right direction conversion gear mechanisms 63 (66) drivingly coupled to the left and right screw feed mechanisms, and the transmission shaft 62 arranged to pass through the output gear 610 of the drive reduction gear mechanism 61 to be rotatable bodily with the output gear 610 and drivingly coupled at opposite ends thereof to input gears of the direction conversion gear mechanisms 63 (66). The lean force bracket 7 is secured at opposite ends thereof to the pair of left and right casings 630 (635, 665) which respectively support the direction conversion gear mechanisms 63 (66), and is also secured at the opposite ends to the upper rails 3. The housing 611 (615, 618) supporting the drive reduction gear mechanism 61 is secured to the mid portion of the lean force bracket 7.

With this configuration, since the rotational speed of the electric motor 5 can be sufficiently reduced by the drive reduction gear mechanism 61 and since the direction conversion gear mechanisms 63 (66) can take a simple construction that only converts the direction for rotational transmission from one direction to another while transmitting the rotation at the same speed or at a slightly reduced speed, the vehicle seat slide device 1 (12, 13) can be reduced in meshing vibration and can be downsized. Therefore, it becomes possible to downsize the casings 630 (635, 665) supporting the direction conversion gear mechanisms 63 (66) therein and hence, to make small the cross-section of the upper rails 3 to which the casings 630 (635, 665) are secured. Further, since the direction conversion gear mechanisms 63 (66) transmit rotation at the same speed or at the slightly reduced speed, they can be made of a synthetic resin as a whole if need be. In addition, since the axis of the electric motor 5 is vertically offset from the axis of the transmission shaft 62 for transmitting the rotation from the electric motor 5 to the left and right screw feed mechanisms, the subassembly of the electric motor 5 and the drive reduction gear mechanism 61 can be arranged, for example, alongside either one of the left and right rails 3, 2, so that a space can be secured between the subassembly and the vehicle seat.

Further, since the housing 611 (615, 618) which supports the drive reduction gear mechanism 61 and the casings 630 (635, 665) which respectively support the left and right direction conversion gear mechanisms 63 (66) are united by being supported by the lean force bracket 7, there can be attained an advantage that the occurrence of the misalignment between the left and right direction conversion gear mechanisms 63 (66) is not theoretically needed to be taken into consideration. In particular, the lean force bracket 7 so united is further enhanced in rigidity as a whole as being secured also to either one of the lower rails 2 and the upper rails 3. This ensures that the drive reduction gear mechanism 61, the left and right direction conversion gear mechanisms 63 (66) and either one of the lower rails 2 and the upper rails 3 move as one unit in the forward-rearward direction of the vehicle during the operation of the electric motor 5. That is, misalignment in the forward-rearward direction hardly occurs between the left and right subassemblies of the either one rails and the direction conversion gear mechanisms 63 (66). Accordingly, since the misalignment hardly occurs, it can be realized to suppress the generation of noises. Further, while the aforementioned prior art devices employ left and right brackets which are arranged independently to secure a reduction section or direction conversion gear mechanisms, the vehicle seat slide device 1 (12, 13) in each of the present embodiments uses the single lean force bracket 7, and this advantageously results in a decrease in the number of components.

In the foregoing first to third embodiments, as typically shown in FIGS. 2, 8 and 12, the provision of the fixing portions 73 (75, 77) on the lean force bracket 7 makes it possible that the casings 630 (635, 665) supporting the direction conversion gear mechanisms 63 (66) are fixed to the fixing portions 73 (75, 77), so that further enhancement in rigidity can be realized as a whole.

In the foregoing first and second embodiments, as typically shown in FIGS. 2 and 8, since the fixing portions 73 (75) are provided with the slit portions 731 (735) and the casings 630 (635) supporting the direction conversion gear mechanisms 63 are provided with the hook portions 631 (636), it becomes possible easily to support and fix the casings 630 (635) to the lean force bracket 7 only by inserting and engaging the hook portions 631 (636) into and with the slit portions 731 (735).

Also in the foregoing first and second embodiments, as typically shown in FIGS. 2 and 8, since the fixing portions 73 (75), the casings 630 (635) and the upper rails 3 are respectively provided with the through holes 732, 633, 331 (736, 637, 331) for the fixing members 8 to pass therethrough and are fixed together by the fixing members 8, the support of these components by the lean force bracket 7 can be further ensured. The fixing through holes completed by the through holes 732, 633, 331 (736, 637, 331) in alignment are provided to extend in a direction which intersects (preferably, intersects perpendicularly) with the lengthwise direction of the lean force bracket 7 in which the slit portion 731 (735) are cut out, and the fixings are made by inserting the fixing members 8 respectively into the fixing through holes. This, in cooperation with the fixings by engagements between the slit portions 731 (735) and the hook portions 631 (636), makes it possible to reliably prevent any component from being disengaged from the assembly. This is because the engagements are made in the directions in which the assembled components intersect with one another and serve to restrict the assembled components from moving to be disengaged from one another.

Also in the foregoing first and second embodiments, as typically shown in FIGS. 2 and 8, since the screw shafts 4 are respectively rotatably supported on the left and right upper rails 3 to be axially movable together with the left and right upper rails 3 along the lower rails 2 and since the direction conversion gear mechanism 63 are respectively drivingly coupled to the screw shafts 4 for transmitting the rotation of the electric motor 5 to the screw shafts 4, it can be realized to unite the lean force bracket 4 with the left and right upper rails 3 in a simplified construction for driving power connection. In particular, since the transmission mechanism 6 and the lean force bracket 7 can be arranged at either the forward ends or the rearward ends of the upper rails 3, it becomes possible to reserve the space under the vehicle seat for vacant.

In the foregoing third embodiment, as shown in FIGS. 11 and 12, since the nut members 9 are rotatably supported on the upper rails 3 to be axially movable together with the upper rails 3 along the screw shafts 41 which are non-rotatably secured to the lower rails 2 and since the direction conversion gear mechanisms 66 are drivingly coupled to the nut members 9 for transmitting the rotation of the electric motor 5 to the nut members 9, it can be realized to unite the lean force bracket 7 with the left and right upper rails 3 at the longitudinal mid position of the rail assembly which position is hardly accessed by the passenger on the vehicle seat.

Also in the foregoing third embodiment, as shown in FIGS. 11 and 12, the upper rails 3 are respectively provided with the cutouts 34 for receiving the casings 665 therein, the fixing portion 77 at each end of the lean force bracket 7 is secured to the upper rail 3 at both longitudinal sides of the cutout 34, and the casings 665 are secured to the lean force bracket 7 by means of fixing members 772 passing through the through holes 771, 667 which are formed in the fixing portion 77 and the casings 665 in the forward-rearward direction. Thus, the casings 665 supporting the direction conversion gear mechanisms 66 can be secured to the lean force bracket 7 in a simplified construction.

Also in the foregoing third embodiment, as shown in FIGS. 11 and 12, since each of the support brackets 671 which are provided with the holder portions 672 for supporting the casings 665 is put between the upper rail 3 and the fixing portion 77 of the lean force bracket 7, the lean force bracket 7 and the casings 665 can be firmly secured to the upper rails 3, so that it can be realized to further enhance the rigidity of the assembled structure as a whole.

In the foregoing first embodiment, as typically shown in FIG. 2, since the housing 611 which supports the drive reduction gear mechanism 61 is provided with the fastening portions 612 and the lean force bracket 7 is provided with the cutout portions 74 into which the fastening portions 612 are to be inserted, it becomes possible to fix the lean force bracket 7 and the housing 611 together only by inserting and engaging the fastening portions 612 into and with the cutout portions 74. Therefore, it can be done easily to support and fix the housing 611 to the lean force bracket 7. In particular, in the case of taking the configuration that the casings 630 which support the direction conversion gear mechanisms 63 hold the opposite end portions of the transmission shaft 62 to restrict the axial movement of the same, the relative movement between the fastening portions 612 and the cutout portions 74 in the direction for engaging movement is also restricted, so that the fixing therebetween can be reliably achieved without taking any other fixing measures than the engagements between the fastening portions 612 and the cutout portions 74. Thus, the fixing of the electric motor 5 and the housing 611 to the lean force bracket 7 can be done easily.

In the foregoing second embodiment, as typically shown in FIG. 8, since the housing 615 which supports the drive reduction gear mechanism 61 is secured to the lean force bracket 7 through the damper 65 having an elastic area, the vibration generated in the drive reduction gear mechanism 61 can be prevented from being transmitted to the lean force bracket 7 and then, in turn to the vehicle seat and the vehicle floor through the upper rails 3 and the lower rails 4.

Also in the foregoing second embodiment, as typically shown in FIG. 8, since the embracing portion 76 provided on the lean force bracket 7 embraces the fastening portion 616 of the housing 615 together with the damper 65 to secure the housing 615 to the lean force bracket 7, it can be realized to reliably secure the housing 615 to the lean force bracket 7 through the damper 65 in a simplified construction.

In the foregoing first to third embodiments, as typically shown in FIGS. 3, 4, 6 and 11, since the lean force bracket 7 covers the transmission shaft 62 inside thereof, possible causes to interfere with the rotation of the transmission shaft 62 can be lessened. The transmission shaft 62 is a primary component or member which is coupled to both of the output gear 610 of the drive reduction gear mechanism 61 and the input gears of the direction conversion gear mechanisms 63 (66) to transmit rotation therebetween. In particular, the transmission shaft 62 is a member which is not only arranged under the vehicle seat and very close to the passenger on the vehicle seat but is also rotated. Therefore, by obviating any interference from outside with the rotation, it becomes possible to enhance safeness and to ensure the operation in the transmission function. Accordingly, the shape of the lean force bracket 7 is desired to take the shape that covers at least one side in the forward-rearward direction of the vehicle seat which one side is accessed by the passenger on the vehicle seat. In addition, by forming the lean force bracket 7 to the cross-section capable of covering the transmission shaft 62, the lean force bracket 7 is further increased in the rigidity against bending moment, and this advantageously results in further effectively preventing the misalignment between the left and right upper rails 3.

Also in the foregoing first to third embodiments, as typically shown in FIGS. 1, 5, 7 and 12, since each of the screw shafts 4 (41) is arranged inside the subassembly of the lower and upper rails 2, 3 associated therewith, each screw shaft 4 (41) is housed in either rail assembly associated therewith, so that the vehicle seat slide device 1 (12, 13) can be made to be compact in construction.

Obviously, numerous further modifications and variations of the present invention are possible in light of the above teachings. It is therefore to be understood that within the scope of the appended claims, the present invention may be practiced otherwise than as specifically described herein.

What is claimed is:

1. A vehicle seat slide device comprising:
   a pair of left and right lower rails adapted to be mounted on a vehicle floor;
   a pair of left and right upper rails adapted to support a vehicle seat and slidably supported respectively on the lower rails;
   a left screw feed mechanism provided between the left lower rail and the left upper rail, the left screw feed mechanism including a screw shaft and a nut member screw-engaged with the screw shaft and relatively rotatable for moving the left upper rail along the left lower rail;
   a right screw feed mechanism provided between the right lower rail and the right upper rail, the right screw feed mechanism including a screw shaft and a nut member screw-engaged with the screw shaft and relatively rotatable for moving the right upper rail along the right lower rail;
   an electric motor being in driving connection to the left and right screw feed mechanisms and constituting a driving source for effecting relative rotations between the screw shaft and the nut member of the left screw feed mechanism and between the screw shaft and the nut member of the right screw feed mechanism;
   a transmission mechanism arranged between the electric motor and the left and right screw feed mechanisms and composed of a housing which supports a drive reduction gear mechanism drivingly coupled to an output shaft of the electric motor, a pair of left and right casings which support direction conversion gear mechanisms drivingly coupled to the left and right screw feed mechanisms, and a transmission shaft arranged to pass through an output gear of the drive reduction gear mechanism to be rotatable bodily with the output gear and drivingly coupled at opposite ends thereof to input gears of the direction conversion gear mechanisms; and
   a bracket secured to either one of the upper rails and the lower rails and supporting the housing and the pair of left and right casings.

2. The vehicle seat slide device as set forth in claim 1, wherein the bracket is provided at opposite ends thereof with fixing portions for respectively fixing the casings thereto and is secured at the fixing portions to said either one of the upper rails and the lower rails.

3. The vehicle seat slide device as set forth in claim 2, wherein:
the fixing portions have slit portions; and
the casings are provided with hook portions having at root portions thereof neck portions which are inserted into the slit portions to be engaged with the slit portions.

4. The vehicle seat slide device as set forth in claim 2, wherein the fixing portions, the casings and said either one of the upper rails and the lower rails respectively have through holes which complete fixing through holes passing in a direction intersecting with the lengthwise direction of the bracket, the device further comprising:
rod-like fixing members inserted respectively into the fixing through holes and fixing the fixing portions, the casings and said either one of the upper rails and the lower rails together.

5. The vehicle seat slide device as set forth in claim 1, wherein:
the nut members of the left and right screw feed mechanisms are respectively secured to the left and right lower rails, while the screw shafts of the left and right screw feed mechanisms are respectively rotatably supported on the left and right upper rails to be axially movable together with the left and right upper rails; and
the direction conversion gear mechanisms are drivingly coupled to the screw shafts of the left and right screw feed mechanisms for transmitting the rotation of the electric motor to the screw shafts.

6. The vehicle seat slide device as set forth in claim 1, wherein:
the screw shafts of the left and right screw feed mechanisms are respectively non-rotatably secured to the left and right lower rails, while the nut members of the left and right screw feed mechanisms are respectively rotatably supported on the left and right upper rails to be axially movable together with the left and right upper rails; and
the direction conversion gear mechanisms are drivingly coupled to the nut members of the left and right screw feed mechanisms for transmitting the rotation of the electric motor to the nut members.

7. The vehicle seat slide device as set forth in claim 2, wherein:
the screw shafts of the left and right screw feed mechanisms are respectively non-rotatably secured to the left and right lower rails, while the nut members of the left and right screw feed mechanisms are respectively rotatably supported on the left and right upper rails to be axially movable together with the left and right upper rails; and
the direction conversion gear mechanisms are drivingly coupled to the nut members of the left and right screw feed mechanisms for transmitting the rotation of the electric motor to the nut members.

8. The vehicle seat slide device as set forth in claim 7, wherein:
the left and right upper rails are respectively provided with cutouts for receiving the casings therein;
the fixing portion at each end of the bracket is secured to the upper rail on the same end at both sides of the cutout provided on the upper rail; and
the casings are secured to the bracket by means of fixing members inserted into through holes which are formed in the fixing portions and the casings in the forward-rearward direction.

9. The vehicle seat slide device as set forth in claim 8, further comprising:
support brackets respectively fitted in the cutouts provided on the upper rails and having holder portions which respectively support the casings, each of the support brackets being put between the upper rail and the fixing portion at both sides of the cutout provided on the upper rail.

10. The vehicle seat slide device as set forth in claim 1, further comprising:
a fastening portion provided on the housing at a position where the housing is supported by the bracket, the fastening portion being formed at its root portion with a neck portion extending in the axial direction of the output gear;
wherein the bracket has a cutout portion with which the fastening portion is engaged by being inserted.

11. The vehicle seat slide device as set forth in claim 1, further comprising:
a damper having an elastic area and interposed between the housing and the bracket for securing the housing to the bracket through the damper.

12. The vehicle seat slide device as set forth in claim 1, further comprising:
a fastening portion provided on the housing at a position where the housing is supported by the bracket, the fastening portion being formed at its root portion with a neck portion extending in the axial direction of the output gear;
a damper having an elastic area for covering the fastening portion; and
an embracing portion provided on the bracket and embracing the fastening portion together with the damper to secure the housing to the bracket.

13. The vehicle seat slide device as set forth in claim 1, wherein the bracket is arranged to cover the transmission shaft.

14. The vehicle seat slide device as set forth in claim 1, wherein each of the screw shafts is arranged inside a subassembly composed of the lower and upper rails associated therewith.

15. A vehicle seat slide device comprising:
a pair of left and right lower rails adapted to be mounted on a vehicle floor;
a pair of left and right upper rails adapted to support a vehicle seat and slidably supported respectively on the lower rails;
a left screw feed mechanism provided between the left lower rail and the left upper rail, the left screw feed mechanism including a screw shaft and a nut member screw-engaged with the screw shaft and relatively rotatable for moving the left upper rail along the left lower rail;
a right screw feed mechanism provided between the right lower rail and the right upper rail, the right screw feed mechanism including a screw shaft and a nut member screw-engaged with the screw shaft and relatively rotatable for moving the right upper rail along the right lower rail;
an electric motor being in driving connection to the left and right screw feed mechanisms and constituting a driving source for effecting relative rotations between the screw shaft and the nut member of the left screw feed mechanism and between the screw shaft and the nut member of the right screw feed mechanism;

a transmission mechanism arranged between the electric motor and the left and right screw feed mechanisms and including a drive reduction gear mechanism drivingly coupled to an output shaft of the electric motor, the transmission mechanism including a housing that supports the electric motor and the drive reduction gear mechanism;

a pair of left and right casings which support direction conversion gear mechanisms drivingly coupled to the left and right screw feed mechanisms, and a transmission shaft arranged to pass through an output gear of the drive reduction gear mechanism to be rotatable bodily with the output gear and drivingly coupled at opposite ends thereof to input gears of the direction conversion gear mechanisms; and a bracket secured to either one of the upper rails and the lower rails, placed above the transmission shaft for covering the transmission shaft, and supporting the housing and the pair of left and right casings.

16. The vehicle seat slide device as set forth in claim 15, wherein the bracket is connected at right and left ends thereof to the right upper rail and the left upper rail respectively.

* * * * *